(12) United States Patent
Kasai et al.

(10) Patent No.: US 7,970,268 B2
(45) Date of Patent: Jun. 28, 2011

(54) SETTING OF PHOTOGRAPHIC PARAMETER VALUE

(75) Inventors: Tsuneo Kasai, Azumino (JP); Hirokazu Kasahara, Okaya (JP); Michihiro Nagaishi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 882 days.

(21) Appl. No.: 11/704,742

(22) Filed: Feb. 8, 2007

(65) Prior Publication Data

US 2007/0183767 A1 Aug. 9, 2007

(30) Foreign Application Priority Data

Feb. 9, 2006 (JP) ................................. 2006-032307

(51) Int. Cl.
*G03B 17/00* (2006.01)
(52) U.S. Cl. ........................................................ 396/57
(58) Field of Classification Search .................... 396/57, 396/213
See application file for complete search history.

(56) References Cited

U.S. PATENT DOCUMENTS

| | | | |
|---|---|---|---|
| 6,459,388 B1 * | 10/2002 | Baron | 340/996 |
| 6,970,189 B1 * | 11/2005 | Bernstein et al. | 348/211.2 |
| 7,220,637 B2 | 5/2007 | Ota et al. | |
| 7,307,658 B2 | 12/2007 | Mino | |
| 7,531,402 B2 | 5/2009 | Ota et al. | |
| 7,563,663 B2 | 7/2009 | Ota et al. | |
| 2002/0076217 A1 * | 6/2002 | Rodriguez et al. | 396/72 |
| 2009/0253235 A1 | 10/2009 | Ota et al. | |

FOREIGN PATENT DOCUMENTS

| | | |
|---|---|---|
| JP | 07-013225 A | 1/1995 |
| JP | 2002-010135 | 1/2002 |
| JP | 2002-185835 A | 6/2002 |
| JP | 2003-069861 A | 3/2003 |
| JP | 2003-110902 A | 4/2003 |
| JP | 2003-153069 A | 5/2003 |
| JP | 2004-064385 A | 2/2004 |
| JP | 2004-145424 A | 5/2004 |
| JP | 2005-091659 | 4/2005 |

* cited by examiner

*Primary Examiner* — W. B. Perkey
(74) *Attorney, Agent, or Firm* — Nutter McClennen & Fish LLP; John J. Penny, Jr.

(57) ABSTRACT

Provided is a photographing parameter setting system including: a photographing device which photographs an image; and a photographing information providing device which provides photographing information for specifying predetermined photographing parameter values to the photographing device, wherein the photographing information providing device includes: a photographing information storage unit which stores photographing information corresponding to a photographing opportunity defined by a temporal range and a geographic range; and a photographing information transmission unit which transmits the photographing information stored in the photographing information storage unit, and wherein the photographing device includes: a photographing information reception unit which receives the photographing information transmitted from the photographing information transmission unit; and a photographing parameter setting unit which sets the predetermined photographing parameter values used for photographing at the photographing opportunity, on the basis of the received photographing information.

3 Claims, 10 Drawing Sheets

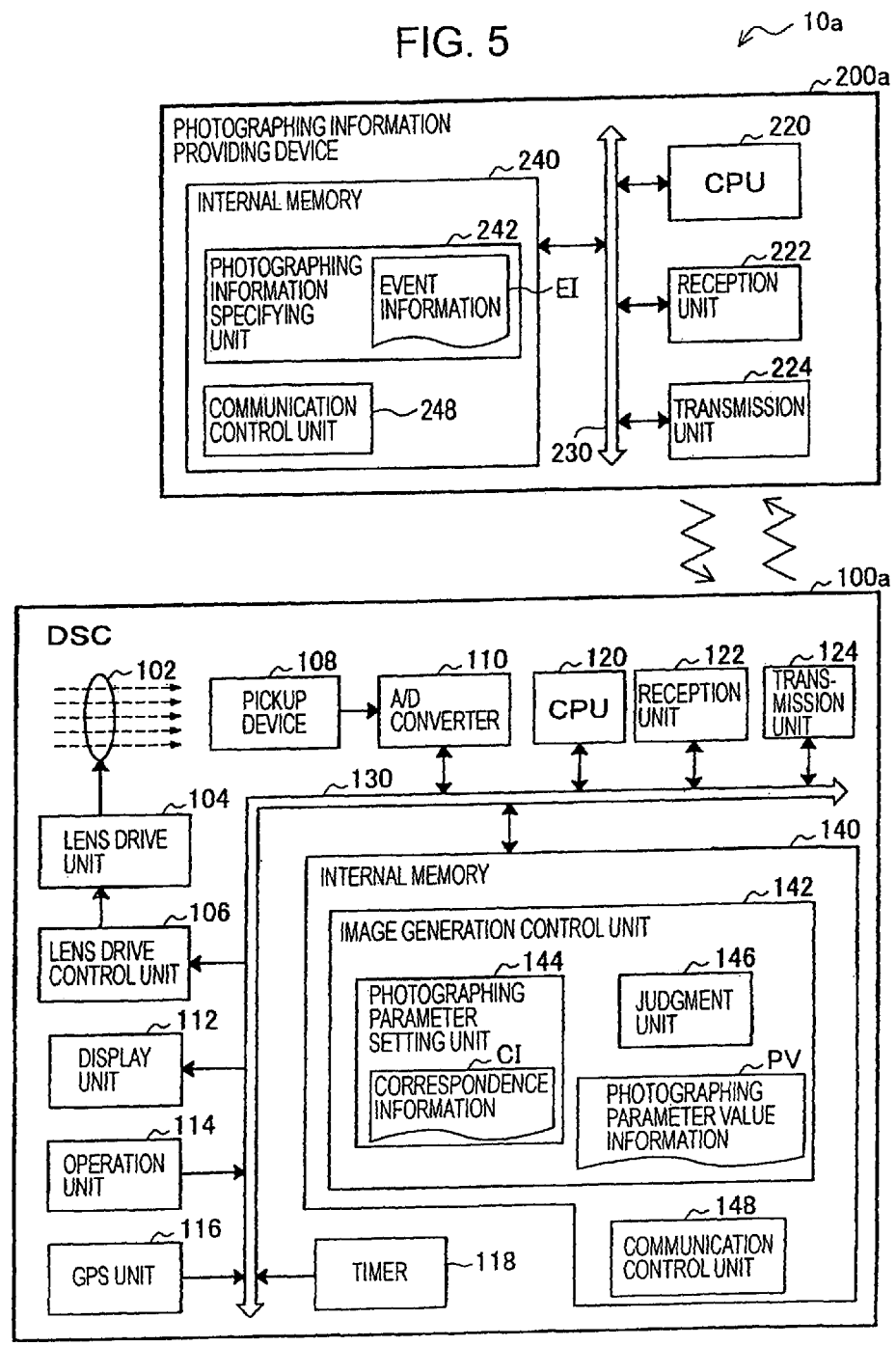

FIG. 6

| TIME | POSITION | EVENT | SCENE |
|---|---|---|---|
| 1 MAY xx:yy - 1 MAY xx':yy' | AAA MOUNTAIN (LATITUDE aa - aa' LONGITUDE bb - bb') | AUTUMN LEAVES FESTIVAL | AUTUMN LEAVES |
| ... | ... | ... | ... |

| SCENE | SHUTTER SPEED | DIAPHRAGM | EXPOSURE | SENSITIVITY | PHOTOMETRY | WB | MEMORY COLOR | FLASH | SHARPNESS | COLOR SATURATION | CONTRAST |
|---|---|---|---|---|---|---|---|---|---|---|---|
| PORTRAIT | AUTO | AUTO | 0 | STANDARD | MULTI | AUTO | SKIN COLOR | AUTO | SOFT | STANDARD | STANDARD |
| LANDSCAPE | AUTO | NARROW | 0 | STANDARD | MULTI | AUTO | SKY, GREEN | AUTO | HARD | HIGH | STRONG |
| NIGHT SCENE | AUTO | AUTO | 0 | STANDARD | MULTI | FIXED | - | AUTO | STANDARD | HIGH | STANDARD |
| AUTUMN LEAVES | AUTO | AUTO | 0 | STANDARD | MULTI | AUTO | RED | AUTO | HARD | HIGH | STANDARD |
| ... | ... | ... | ... | ... | ... | ... | ... | ... | ... | ... | ... |

CI

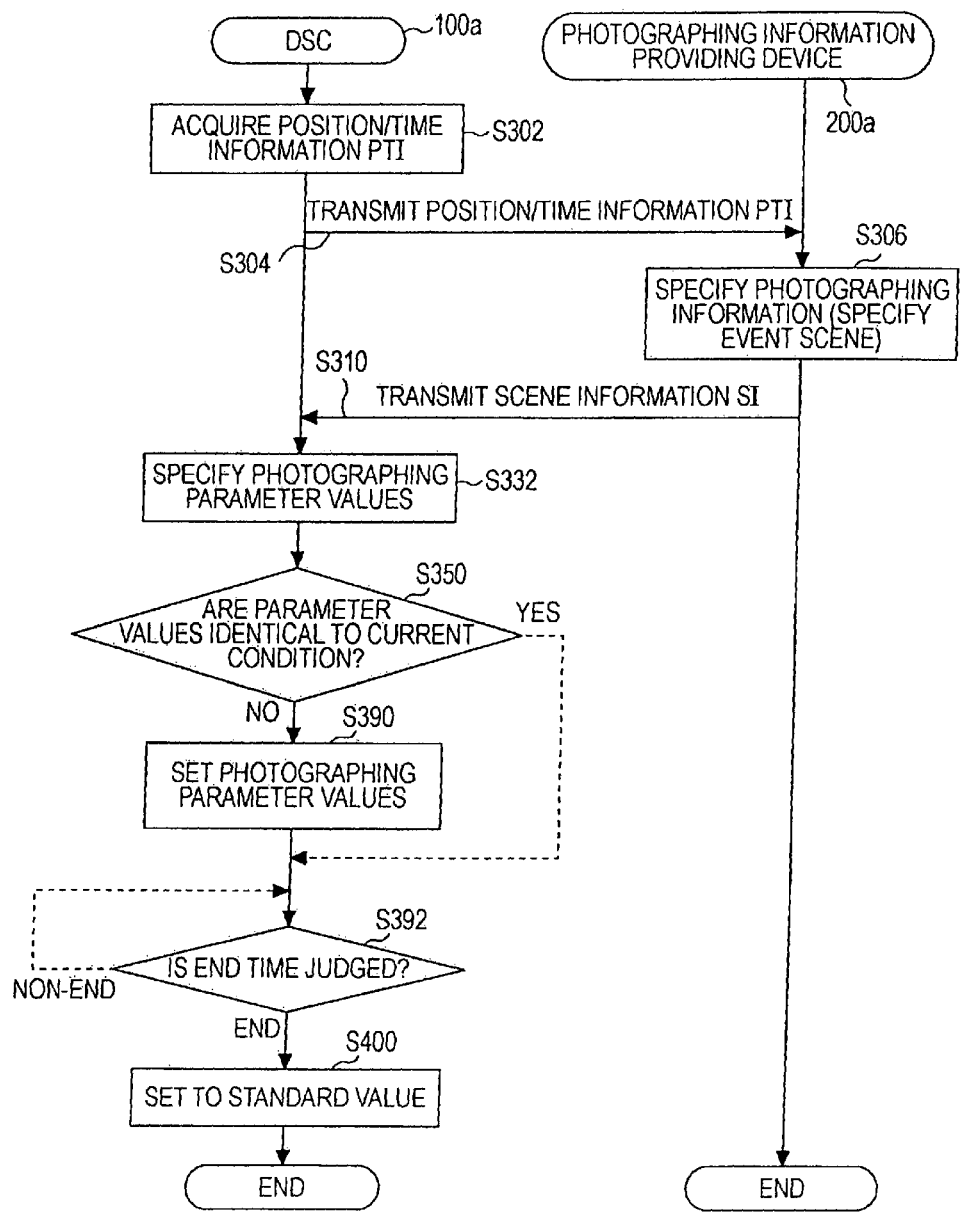

FIG. 10

| SCENE | END TIME |
|---|---|
| AUTUMN LEAVES | 1 MAY xx':yy' |

SI

SETTING OF PHOTOGRAPHIC PARAMETER VALUE

BACKGROUND

1. Technical Field

The present invention relates to a technology of setting optimal photographing parameters in a photographing device.

2. Related Art

Recently, digital still cameras (hereinafter, also referred to as DSCs) for generating image data indicating an image of a subject by photographing the subject using a pickup device have been widely used. Generally, in DSCs, a variety of photographing parameter values such as shutter speed or diaphragm setting can be adjusted. At the time of photographing using a DSC, a desired image can be obtained by setting adequate photographing parameter values suitable for a photographing condition (for example, a photographing condition for photographing a person or a photographing condition for photographing autumn leaves). Here, the photographing condition is also called a scene or a subject.

Conventionally, in DSCs, a technology of automatically setting photographing parameter values suitable for a photographing condition using schedule setting is known (for example, JP-A-2005-91659). In DSCs, a technology of automatically setting photographing parameter values suitable for a photographing condition by generating a preliminary image (temporary image) and analyzing the temporary image to judge the photographing condition is known (for example, JP-A-2002-10135).

In JP-A-2005-91659, since a user needs to previously set a schedule, there is a problem that the burden on the user increases. For example, when previously set schedule contents vary, photographing parameter values which are not suitable for the photographing condition may be set and thus there is room for improvement in terms of convenience for the user.

In JP-A-2002-10135, since the photographing condition is judged by analyzing the temporary image, the photographing condition may not be adequately judged and thus there is a problem that optimal photographing parameter values may not be set.

Such a problem is not limited to DSCs and may occur when setting photographing parameter values in other general photographing devices.

SUMMARY

An advantage of the invention is to provide a technology of easily and adequately setting photographing parameter values in a photographing device.

According to an aspect of the invention, there is provided a photographing parameter setting system including: a photographing device which photographs an image; and a photographing information providing device which provides photographing information for specifying predetermined photographing parameter values to the photographing device, wherein the photographing information providing device includes: a photographing information storage unit which stores photographing information corresponding to a photographing opportunity defined by a temporal range and a geographic range; and a photographing information transmission unit which transmits the photographing information stored in the photographing information storage unit, and wherein the photographing device includes: a photographing information reception unit which receives the photographing information transmitted from the photographing information transmission unit; and a photographing parameter setting unit which sets the predetermined photographing parameter values used for photographing at the photographing opportunity, on the basis of the received photographing information.

In the photographing parameter setting system, the photographing information corresponding to the photographing opportunity is transmitted from the photographing information transmission unit of the photographing information providing device and the photographing information is received by the photographing information reception unit of the photographing device. The predetermined photographing parameter values used for the photographing at the photographing opportunity on the basis of the received photographing information are set by the photographing parameter setting unit of the photographing device. Accordingly, in the photographing parameter setting system, the photographing device can easily and adequately set the photographing parameter values.

The photographing information transmission unit may transmit the photographing information only within the geographic range of the photographing opportunity and the temporal range of the photographing opportunity.

Since only the photographing device located in the geographic range of the photographing opportunity and the temporal range of the photographing opportunity receives the photographing information, only the photographing device used for the photographing at the photographing opportunity can set the photographing parameter values.

The photographing information storage unit may store plural pieces of photographing information corresponding to a plurality of photographing opportunities, the photographing device may further include a photographing opportunity information transmission unit which transmits photographing opportunity information for specifying the photographing opportunity, which performs the photographing using the photographing device, to the photographing information providing device, and the photographing information providing device may further include a photographing opportunity information reception unit which receives the photographing opportunity information transmitted from the photographing opportunity information transmission unit; and a photographing information specifying unit which specifies the photographing opportunity which performs the photographing using the photographing device and specifies the photographing information to be transmitted to the photographing device, on the basis of the received photographing opportunity information.

Since the photographing information providing device can be placed independent of the geographic range of the photographing opportunity and a time for transmitting the photographing information through the photographing information providing device can be set independent of the temporal range. A single photographing information providing device can be commonly used for setting the photographing parameter values at the time of photographing at the plurality of photographing opportunities.

The photographing device may further include a position information acquiring unit which acquires position information for specifying a current position of the photographing device; and a time information acquiring unit which acquires time information for specifying a current time, and the photographing opportunity information may include the position information and the time information.

The photographing information providing device can easily specify the photographing opportunity for performing the photographing using the photographing device.

The photographing information transmitted from the photographing information transmission unit may be photographing condition specifying information indicating whether a photographing condition at the photographing opportunity corresponds to any one of a plurality of predetermined photographing conditions, and the photographing parameter setting unit may include correspondence information for defining the plurality of photographing conditions and the predetermined photographing parameter values.

It is possible to reduce the amount of information communicated between the photographing information providing device and the photographing device and to reduce a communication load or increase the speed of the process.

The photographing device may further include a photographing condition specifying information adding unit which adds the photographing condition specifying information to an image file indicating the image generated by the photographing.

The photographing condition specifying information added to the image file can be used for searching the image after the photographing using the photographing device.

The photographing device may further include a judgment unit which judges whether the photographing at the photographing opportunity is finished, and the photographing parameter setting unit may cancel the setting of the predetermined photographing parameter values on the basis of the photographing information when it is judged that the photographing at the photographing opportunity is finished by the judgment unit.

After the photographing at the photographing opportunity is finished, the setting of the predetermined photographing parameter values on the basis of the photographing information can be easily and surely cancelled.

According to another aspect of the invention, there is provided a photographing device which photographs an image, including: a photographing information reception unit which receives photographing information for specifying predetermined photographing parameter values; and a photographing parameter setting unit which sets the predetermined photographing parameter values used for photographing on the basis of the received photographing information.

The photographing device receives the photographing information for specifying the predetermined photographing parameter values and sets the predetermined photographing parameter values on the basis of the received photographing information. Accordingly, the photographing device can easily and adequately set the photographing parameter values.

The invention may be implemented in a variety of aspects, such as a photographing parameter setting method and system or device, a photographing method and system or device, an image generating method and system or device, an image correcting method and system or device, a computer program for realizing the function of these methods, systems or devices, a recording medium having the computer program recorded thereon, and a data signal including the computer program and implemented in a carrier.

BRIEF DESCRIPTION OF THE DRAWINGS

The invention will be described with reference to the accompanying drawings, wherein like numbers reference like elements.

FIG. 5 is a schematic view showing the configuration of a photographing parameter setting system 10a according to a second embodiment.

FIG. 6 is a view showing an example of contents of event information EI.

FIG. 7 is a view showing an example of contents of correspondence information CI.

FIG. 8 is a flowchart showing a photographing parameter value setting process of the photographing parameter setting system 10a according to the second embodiment.

FIG. 10 is a view showing an example of content of scene information SI.

DESCRIPTION OF EXEMPLARY EMBODIMENTS

Figure 1:
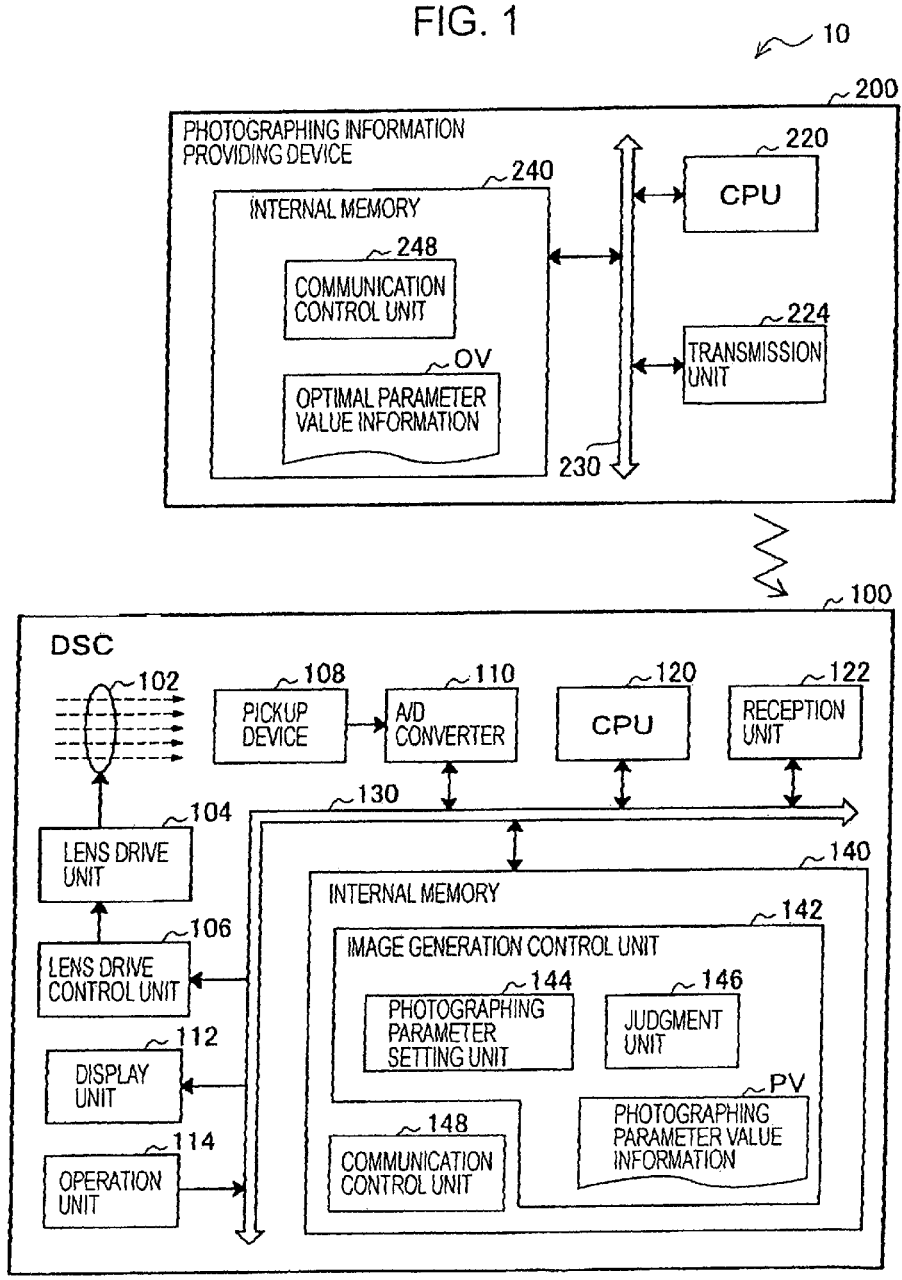
FIG. 1 is a schematic view showing the configuration of a photographing parameter setting system 10 according to a first embodiment of the present invention.

Next, embodiments of the present invention will be described in the following order.
A. First Embodiment
B. Second Embodiment
C. Modified examples A. First Embodiment FIG. 1 is a schematic view showing the configuration of a photographing parameter setting system 10 according to a first embodiment of the present invention. The photographing parameter setting system 10 according to the first embodiment includes a digital still camera (hereinafter, also referred to as DSC) 100 and a photographing information providing device 200.

The DSC 100 is a photographing device for photographing a subject using a pickup device and generating image data indicating an image of the subject. The DSC 100 includes a lens 102, a lens drive unit 104 for driving the lens 102 and adjusting focal length, a lens driving control unit 106 for controlling the lens drive unit 104, a pickup device 108 for converting light which enters a light-receiving surface through the lens 102 into an electric signal, an A/D converter 110 for performing A/D conversion of the electric signal output from the pickup device 108, a display unit 112 for displaying a variety of setting information or the image, an operation unit 114 such as a button or a touch panel for a user operation, a CPU 120 for controlling the units of the DSC, a reception unit 122 for receiving the below-described photographing information from the photographing information providing device 200, and an internal memory 140. The components of the DSC 100 are connected to one another through a bus 130.

In the present embodiment, a charge coupled device (CCD) is used as the pickup device 108. In the present embodiment, a liquid crystal monitor is used as the display unit 112. At the time of photographing using the DSC 100, the image of the subject is displayed on the liquid crystal monitor as the display unit 112. In the present specification, the term "subject" indicates a photographed subject such as persons, objects, or scenes.

In the internal memory 140 of the DSC 100, an image generation control unit 142 and a communication control unit 148 are stored. The image generation control unit 142 is a computer program for controlling a variety of processes such as the photographing of the subject, the A/D conversion of data and a white balance process, under a predetermined operating system. The CPU 120 photographs and generates the image by reading and executing the image generation control unit 142 from the internal memory 140.

The communication control unit 148 is a computer program for controlling the reception unit 122 and receiving information (signal) transmitted from an external device (for example, the photographing information providing device 200). The CPU 120 receives the information by reading and executing the communication control unit 148 from the internal memory 140. The communication control unit 148, the CPU 120 and the reception unit 122 correspond to a photographing information reception unit according to the invention.

The image generation control unit 142 includes a photographing parameter setting unit 144 and a judgment unit 146 as a program module. The respective functions of the units will be described below in a description of a photographing parameter value setting process. The image generation control unit 142 also includes photographing parameter value information PV. The photographing parameter value information PV is information for specifying a variety of photographing parameter values of the DSC 100 used for photographing. The photographing parameter value information PV will be described later.

The photographing information providing device 200 is a server device for providing photographing information for specifying optimal photographing parameter values to the DSC 100. The photographing information providing device 200 includes a CPU 220 for controlling the units of the photographing information providing device 200, a transmission unit 224 for transmitting the photographing information to the DSC 100, and an internal memory 240. The photographing information providing device 200 may include a display unit or an operation unit (not shown). The components of the photographing information providing device 200 are connected to one another through a bus 230.

A communication control unit 248 and optimal parameter value information OV are stored in the internal memory 240 of the photographing information providing device 200. The communication control unit 248 is a computer program for controlling the transmission unit 224 and transmitting information (signal) to the external device (for example, the DSC 100). The CPU 220 transmits the information by reading and executing the communication control unit 248 from the internal memory 240. The communication control unit 248, the CPU 220 and the transmission unit 224 correspond to a photographing information transmission unit according to the invention.

The optimal parameter value information OV stored in the internal memory 240 of the photographing information providing device 200 is information indicating an optimal parameter value used for photographing at a predetermined photographing opportunity with respect to a variety of photographing parameters. Here, the photographing opportunity indicates an event or a state in a specific temporal range and a specific geographic range. In the present specification, the photographing opportunity is also called an "event", examples of which are a variety of sports or games, flower or autumn leaf viewing, concerts, and exhibitions at tourist spots. In the present specification, the term "temporal range" may be a termless continuous temporal range. The internal memory 240 corresponds to a photographing information storage unit according to the invention.

Figure 2:
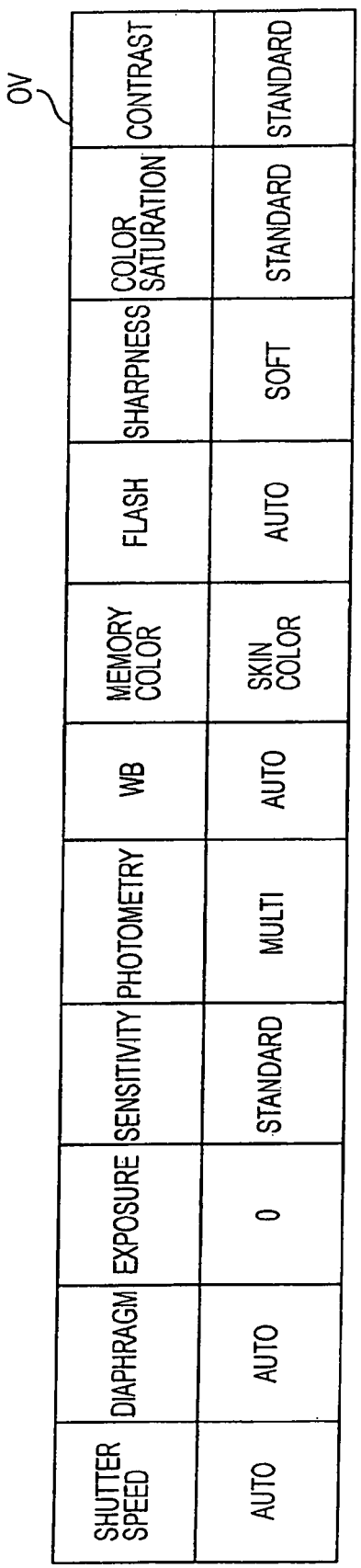
FIG. 2 is a view showing an example of contents of optimal parameter value information OV.

FIG. 2 is a view showing an example of contents of the optimal parameter value information OV. As shown in FIG. 2, in the optimal parameter value information OV, parameter values are displayed with respect to the photographing parameters such as "shutter speed" or "diaphragm setting". The optimal parameter value information OV is previously set, for example, by an event organizer, a manager of an event hall or an information providing service company and stored in the internal memory 240 of the photographing information providing device 200.

The contents of the photographing parameter value information PV (FIG. 1) stored in the internal memory 140 of the DSC 100 are also contents indicating the parameter values with respect to a variety of photographing parameters, similar to the optimal parameter value information OV shown in FIG. 2. The parameter values of the photographing parameter value information PV are used for photography using the DSC 100. In the present embodiment, in an initial state, standard parameter values are displayed in the photographing parameter value information PV.

Figure 3:
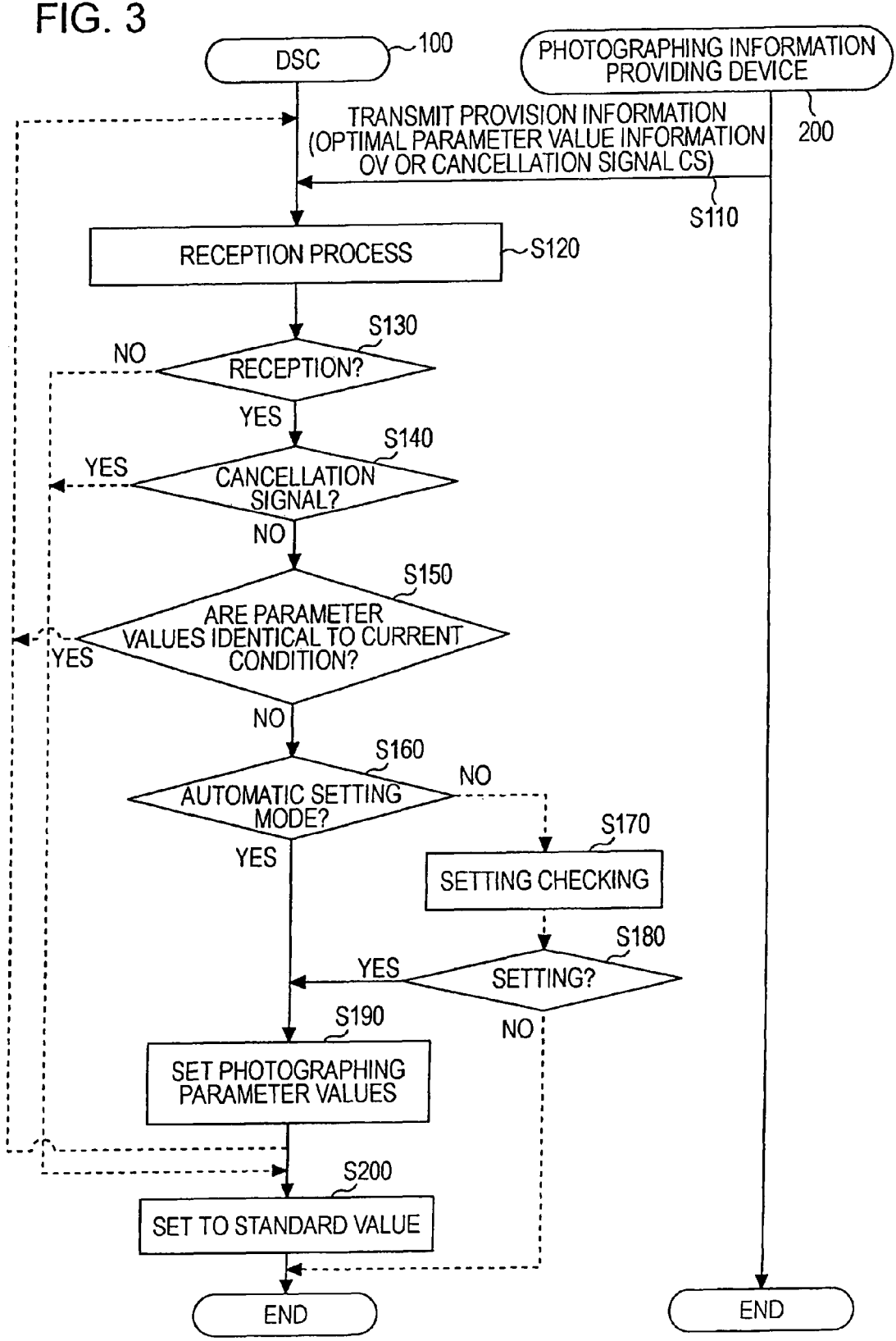
FIG. 3 is a flowchart illustrating a photographing parameter value setting process of the photographing parameter setting system 10 according to the first embodiment.

FIG. 3 is a flowchart illustrating a photographing parameter value setting process of the photographing parameter setting system 10 according to the first embodiment. FIG. 4 is a view showing an outline of the photographing parameter value setting process of the photographing parameter setting system 10 according to the first embodiment. The photographing parameter value setting process of the photographing parameter setting system 10 (FIG. 1) is a process for setting optimal photographing parameter values in the DSC 100.

Figure 4A:
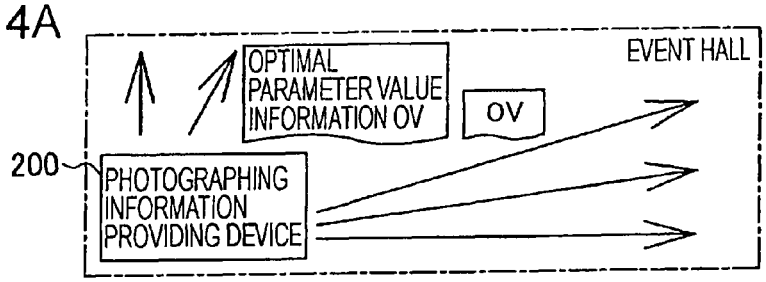
FIG. 4 is a view showing an outline of the photographing parameter value setting process of the photographing parameter setting system 10 according to the first embodiment.

In the present embodiment, the photographing using the DSC 100 is performed in an event hall where a predetermined event is held. FIG. 4A shows an event hall where the photographing using the DSC 100 is performed. As shown in FIG. 4A, in the present embodiment, the photographing information providing device 200 is placed in the event hall.

In a step S110 (FIG. 3), the communication control unit 248 (FIG. 1) of the photographing information providing device 200 controls the transmission unit 224 and transmits the optimal parameter value information OV or a cancellation signal CS. Here, the optimal parameter value information OV corresponds to photographing information for specifying optimal photographing parameter values. The release signal CS is a signal for canceling the setting of the photographing parameter values on the basis of the optimal parameter value information OV with respect to the DSC 100 as described below.

The optimal parameter value information OV or the cancellation signal CS (hereinafter, also collectively referred to as "provision information") is transmitted by the communication control unit 248 of the photographing information providing device 200 such that the provision information reaches only within a predetermined geographic range (see FIG. 4A). Here, the predetermined geographic range is set as a geographic range in which the DSC 100 for the photographing is assumed to be located during the event. In the below description, the predetermined geographic range is also called a provision information transmission range. The provision information transmission range may be the entire event hall or a portion of the event hall.

The communication control unit 248 of the photographing information providing device 200 continuously transmits the optimal parameter value information OV in a period (time period) from the start to the end of the event (see FIG. 4A). On the other hand, the communication control unit 248 continuously transmits the cancellation signal CS in a period from the end of the event to the lapse of a predetermined time period (see FIG. 4D). After the lapse of the predetermined time period from the end of the event, the transmission of the provision information using the communication control unit 248 of the photographing information providing device 200 is finished.

In a step S120 (FIG. 3), the communication control unit 148 (FIG. 1) of the DSC 100 performs a reception process. The reception process is a process for controlling the reception unit 122 (FIG. 1) to receive the provision information transmitted from the photographing information providing device 200. In the present embodiment, the reception process is repeatedly performed by the communication control unit 148 whenever a predetermined time period elapses. The reception process may be performed by the communication control unit 148 upon a turn-on operation or a turn-off operation of the DSC 100 by a user.

Figure 4B:
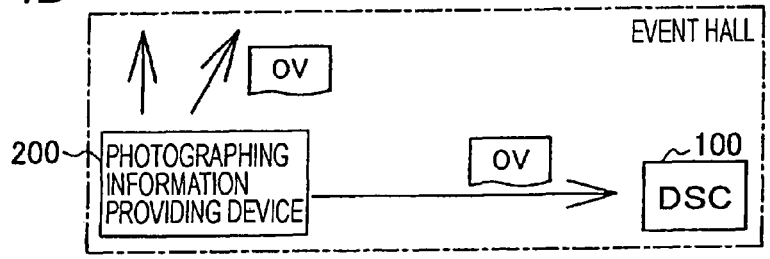

In a step S130 (FIG. 3), the judgment unit 146 (FIG. 1) of the DSC 100 judges whether the provision information is received in the reception process of the step S120. For example, when the DSC 100 is located in the provision information transmission range in a time period when the photographing information providing device 200 transmits the provision information, the provision information is received in the reception process of the step S120. When the provision information is received in the reception process, the process progresses to a step S140. FIG. 4B shows a state in which the DSC 100 located in the provision information transmission range receives the provision information (optimal parameter value information OV). The received provision information is stored in a predetermined area of the internal memory 140. In contrast, when the DSC 100 is located outside the provision information transmission range, the provision information is not received in the reception process. When the provision information is not received in the reception process, the process progresses to a step S200.

In the step S140 (FIG. 3), the judgment unit 146 (FIG. 1) of the DSC 100 judges whether the provision information received in the reception process of the step S120 is the optimal parameter value information OV or the cancellation signal CS. If it is judged that the received provision information is the optimal parameter value information OV, the process progresses to a step S150. In contrast, if it is judged that the received provision information is the cancellation signal CS, the process progresses to the step S200.

In the step S150 (FIG. 3), the judgment unit 146 (FIG. 3) of the DSC 100 judges whether the parameter values indicated by the optimal parameter value information OV (FIG. 2) received in the reception process of the step S120 are identical to parameter values (that is, photographing parameter value information PV (FIG. 1)) which are currently set to be used for photographing. If the parameter values are identical, the process progresses to the step S110, because the photographing parameter value information PV does not need to be updated. In contrast, if the parameter values are not identical, the process progresses to a step S160.

In the step S160 (FIG. 3), the judgment unit 146 (FIG. 1) of the DSC 100 judges whether a current state of the DSC 100 is an automatic setting mode. Here, the automatic setting mode is a mode for automatically setting the update of the photographing parameter value information PV on the basis of the optimal parameter value information OV when the DSC 100 receives the optimal parameter value information OV. The user can give an instruction on the setting of ON/OFF of the automatic setting mode through the operation unit 114 (FIG. 1). If it is judged that the current state is the automatic setting mode, the process progresses to a step S190. In contrast, if it is judged that the current state is not the automatic setting mode, the process progresses to a step S170.

In the step S170 (FIG. 3), the image generation control unit 142 (FIG. 1) of the DSC 100 displays an indication for allowing the user to check whether the update of the photographing parameter value information PV is set on the basis of the received optimal parameter value information OV on the display unit 112 (FIG. 1). For example, the image generation control unit 142 displays a message "Photographing parameter values suitable for photographing of the event have been received. Should these values be set as the parameter values for the photographing?" on the display unit 112.

In a step S180 (FIG. 3), the judgment unit 146 (FIG. 1) of the DSC 100 judges whether there is an instruction of the user on the setting of the update of the photographing parameter value information PV on the basis of the received optimal parameter value information OV. The instruction of the user indicating whether the setting of the update is required is given through the operation unit 114 (FIG. 1). If it is judged that the instruction on the setting of the update is given, the process progresses to the step S190. In contrast, if it is judged that the instruction on the setting of the update is not given, the process is finished because the user does not intend to use the received optimal parameter value information OV. In this case, upon completing the photographing using the DSC 100, photographing parameter values (standard value) defined by the photographing parameter value information PV at an initial state or photographing parameter values which are manually set by the user are used.

Figure 4C:
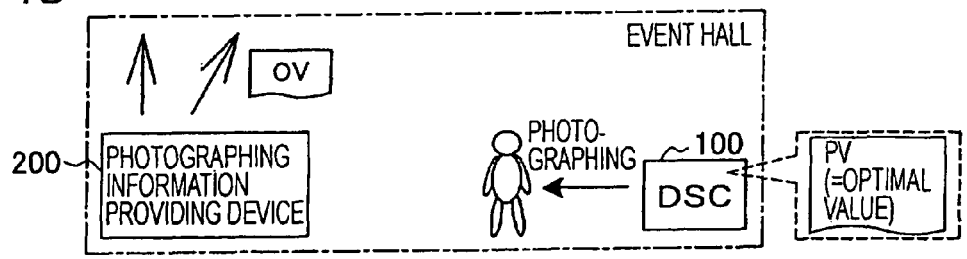

In the step 190 (FIG. 3), the photographing parameter setting unit 144 (FIG. 1) of the DSC 100 sets the update of the photographing parameter value information PV (FIG. 1) on the basis of the optimal parameter value information OV. More particularly, the photographing parameter setting unit 144 replaces the parameter values of the photographing parameters included in the photographing parameter value information PV with the parameter values indicated by the optimal parameter value information OV. The photographing parameter values used for the photographing using the DSC 100 are set to values provided as the photographing parameter values suitable for the photographing of the event by the photographing information providing device 200. Accordingly, it is possible to generate a desired image by the photographing using the DSC 100 in this state. FIG. 4C shows a state in which the photographing is performed using the DSC 100 in which the photographing parameter value information PV is updated to have the optimal parameter value. After the step S190, the process returns to the step S110.

Next, a process after the event is finished will be described. After the event is finished, the photographing parameter value information PV (FIG. 1) set as contents suitable for the photographing during the event is set to the initial state through the below-described process.

Figure 4D:
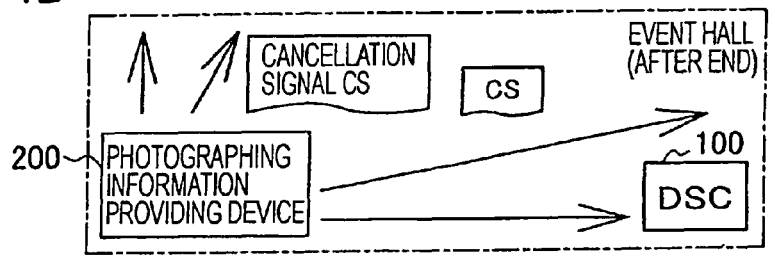

As described above, the communication control unit 248 (FIG. 1) of the photographing information providing device 200 continuously transmits the cancellation signal CS in the time period from the end of the event to the lapse of the predetermined time period (step S110 of FIG. 3). The communication control unit 148 (FIG. 1) of the DSC 100 repeatedly performs the reception process whenever the predetermined time period elapses (step S120). Accordingly, in the reception process after the event is finished, the cancellation signal CS is received as the provision information. FIG. 4D shows a state in which the cancellation signal CS transmitted from the photographing information providing device 200 is received by the DSC 100. At this time, in the judgment of the step S140 (FIG. 3), it is judged that the received provision information is the cancellation signal CS and thus the process progresses to the step S200.

In the step S200 (FIG. 3), the photographing parameter setting unit 144 (FIG. 1) of the DSC 100 sets the update of the photographing parameter value information PV such that the parameter value indicated by the photographing parameter value information PV (FIG. 1) becomes the standard value. Accordingly, the photographing parameter value information PV set as the contents suitable for the photographing during the event is set to the initial state again.

Figure 4E:
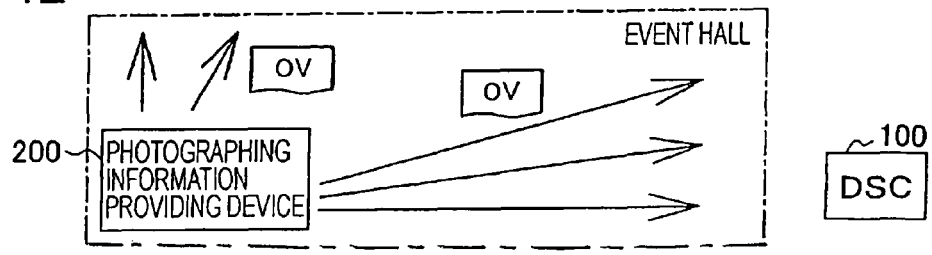

Even when the photographing using the DSC 100 stops and the DSC 100 moves outside the event hall (accurately, the provision information transmission range) before the event is finished, the photographing parameter value information PV (FIG. 1) set as the contents suitable for the photographing during the event is set to the initial state again. FIG. 4E shows a state in which the DSC 100 moves outside the provision information transmission range.

When the DSC 100 moves outside the provision information transmission range before the event is finished, the provision information (optimal parameter value information OV) transmitted from the photographing information providing device 200 is not received by the DSC 100. Accordingly, in the reception judgment (step S130 of FIG. 3), it is judged that the provision information is not received. At this time, the process progresses to the step S200, in which the photographing parameter setting unit 144 (FIG. 1) of the DSC 100 sets the update of the photographing parameter value information PV such that the parameter value indicated by the photographing parameter value information PV (FIG. 1) becomes the standard value, as described above. Accordingly, the photographing parameter value information PV set as the contents suitable for the photographing during the event is set to the initial state again.

As described above, in the photographing parameter value setting process of the photographing parameter setting system 10 (FIG. 1) according to the present embodiment, the optimal parameter value information OV indicating the photographing parameter values suitable for the photographing of the event is transmitted by the photographing information providing device 200 as photographing information. In the DSC 100 which receives the optimal parameter value information OV, the update of the photographing parameter value information PV indicating the photographing parameter values used for the photographing is set on the basis of the optimal parameter value information OV. Accordingly, in the photographing parameter setting system 10 according to the present embodiment, the DSC 100 can easily and appropriately set the photographing parameter values used for the photographing. The photographing parameter value setting process of the photographing parameter setting system 10 according to the present embodiment can be, for example, used in a photography class and is applicable to special photographing for an event or photographing for an artistic effect.

In the photographing parameter value setting process of the photographing parameter setting system 10 according to the present embodiment, the optimal parameter value information OV is transmitted from the photographing information providing device 200 to reach within the provision information transmission range, which is the geographic range in which the DSC 100 for performing the photographing during the event is located, only in the time period from the start to the end of the event. Accordingly, the update of the photographing parameter value information PV on the basis of the optimal parameter value information OV is set only in the DSC 100 used for the photographing during the event such that the same update is not set in a photographing device which is not used for the photographing during the event.

In the photographing parameter value setting process of the photographing parameter setting system 10 according to the present embodiment, when the photographing of the event is not performed by the end of the event or departure from the event hall, the setting of the photographing parameter value information PV on the basis of the optimal parameter value information OV in the DSC 100 is cancelled such that the photographing parameter value information PV returns to the initial state. Accordingly, in the photographing parameter setting system 10 according to the present embodiment, the DSC 100 can easily and reliably perform initialization of the photographing parameter values (change to the standard value) after the photographing of the event is finished.

In the photographing parameter value setting process of the photographing parameter setting system 10 according to the present embodiment, the optimal parameter value information OV indicating the photographing parameter values is transmitted from the provision information providing device 200 to the DSC 100. Accordingly, it is possible to set the photographing parameter values suitable for the photographing of the event, compared with a case of setting the photographing parameter values by selecting one from a plurality of predetermined typical photographing conditions (scenes) in a conventional DSC.

B. Second Embodiment

FIG. 5 is a schematic view showing the configuration of a photographing parameter setting system 10a according to a second embodiment. The photographing parameter setting system 10 according to the second embodiment includes a DSC 100a and a photographing information providing device 200a, similar to the photographing parameter setting system 10 (FIG. 1) according to the first embodiment.

The photographing parameter setting system 10a (FIG. 5) according to the second embodiment is different from the photographing parameter setting system 10 according to the first embodiment in that the photographing information providing device 200a includes a reception unit 222 and a photographing information specifying unit 242 is stored in an internal memory 240 of the photographing information providing device 200a instead of the optimal parameter value information OV (FIG. 1) in the first embodiment.

The reception unit 222 (FIG. 5) of the photographing information providing device 200a receives information (signal) transmitted from the DSC 100a under the control of a communication control unit 248. The communication control unit 248, a CPU 220 and the reception unit 222 correspond to a photographing opportunity information reception unit according to the invention.

The photographing information specifying unit 242 (FIG. 5) stored in the internal memory 240 is a computer program for specifying photographing information to be transmitted to the DSC 100a on the basis of the below-described position/time information PTI. The CPU 220 specifies the photographing information by reading and executing the photographing information specifying unit 242 from the internal memory 240.

The photographing information specifying unit 242 (FIG. 5) includes event information EI. FIG. 6 is a view showing an example of contents of the event information EI. The event information EI is information for specifying the event. In the event information EI according to the present embodiment, the event is specified by a time (temporal range) and a position (geographic range). The event corresponds to the scene by the event information EI. Here, the scene indicates classification of the predetermined photographing conditions. Examples of the scene may be a "portrait" which is a condition for photographing a person, a "landscape" which is a condition for photographing a landscape, an "evening view" which is a condition for photographing an evening view, and "autumn leaves" which are a condition for photographing autumn leaves. In the example of FIG. 6, a scene "autumn leaves" corresponds to an event "autumn leaves festival".

The photographing parameter setting system 10a (FIG. 5) according to the second embodiment is also different from the photographing parameter setting system 10 (FIG. 1) according to the first embodiment in that the DSC 100a includes a GPS unit 116, a timer 118 and a transmission unit 124. The GPS unit 116 acquires current position information (for example, information for specifying latitude and longitude) of the DSC 100a using a GPS system. The timer 118 outputs time information for specifying current date and time. The transmission unit 124 transmits information (signal) to the photographing information providing device 200a under the control of the communication control unit 148. The communication control unit 148, the CPU 120 and the transmission unit 124 correspond to a photographing opportunity information transmission unit according to the invention.

The photographing parameter setting system 10a according to the second embodiment is also different from the photographing parameter setting system 10 according to the first embodiment in that a photographing parameter setting unit 144 of the DSC 100a includes correspondence information CI. FIG. 7 is a view showing an example of contents of the correspondence information CI. That is, as shown in FIG. 7, in the correspondence information CI, photographing parameter values suitable for photographing of the scene are decided with respect to a plurality of predetermined scenes.

FIG. 8 is a flowchart showing a photographing parameter value setting process of the photographing parameter setting system 10a according to the second embodiment. FIG. 9 is a view showing an outline of the photographing parameter value setting process of the photographing parameter setting system 10a according to the second embodiment. The photographing parameter value setting process of the photographing parameter setting system 10a (FIG. 5) according to the second embodiment is a process of setting optimal photographing parameter values in the DSC 100a, similar to the photographing parameter value setting process according to the first embodiment. As shown in FIG. 9, in the photographing parameter value setting process according to the second embodiment, the photographing information providing device 200a is placed at a position other than an event hall.

In a step S302 (FIG. 8), an image generation control unit 142 (FIG. 5) of the DSC 100a acquires the position/time information PTI. The position/time information PTI indicates a current position of the DSC 100a and a current time. In the present embodiment, the position/time information PTI is acquired by the image generation control unit 142 in a photographing place (the event hall) according to an instruction of a user or a turn-on operation of a power supply source. More particularly, the image generation control unit 142 acquires the position/time information PTI by acquiring the position information indicating the current position of the DSC 100a from the GPS unit 116 (FIG. 5) and acquiring the time information indicating the current time from the timer 118.

Figure 9A:
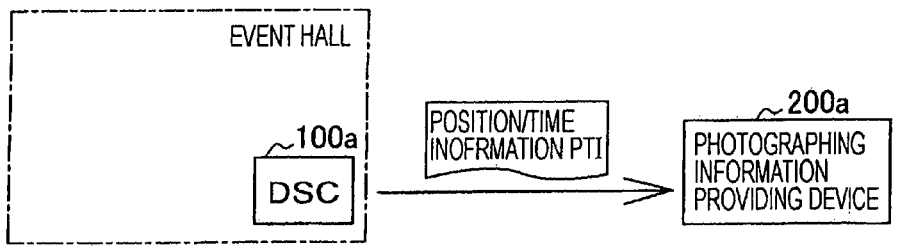
FIG. 9 is a view showing an outline of the photographing parameter value setting process of the photographing parameter setting system 10a according to the second embodiment.

In a step S304 (FIG. 8), the communication control unit 148 (FIG. 5) of the DSC 100a controls the transmission unit 124 to transmit the position/time information PTI to the photographing information providing device 200a. The photographing information providing device 200a receives the transmitted position/time information PTI through the reception unit 222 (FIG. 5). FIG. 9A shows a state in which the position/time information PTI is transmitted from the DSC 100a to the photographing information providing device 200a.

In a step S306 (FIG. 8), the photographing information specifying unit 242 (FIG. 5) of the photographing information providing device 200a specifies the photographing information to be transmitted to the DSC 100a on the basis of the received position/time information PTI. In the present embodiment, scene information SI (described below) indicating a scene is used as the photographing information. Accordingly, the photographing information specifying unit 242 specifies an event corresponding to the position and the time indicated by the position/time information PTI by referring to the event information EI (FIG. 6) and specifies a scene corresponding to the specified event.

Figure 9B:
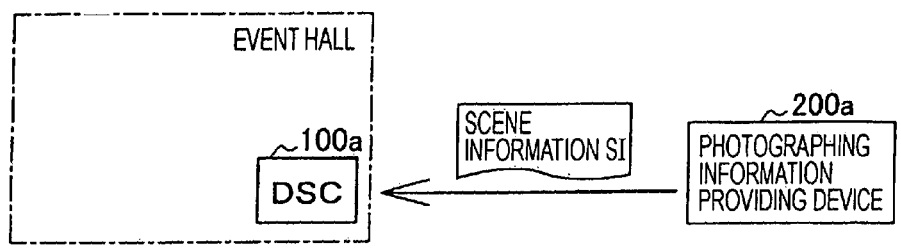
Figure 10:
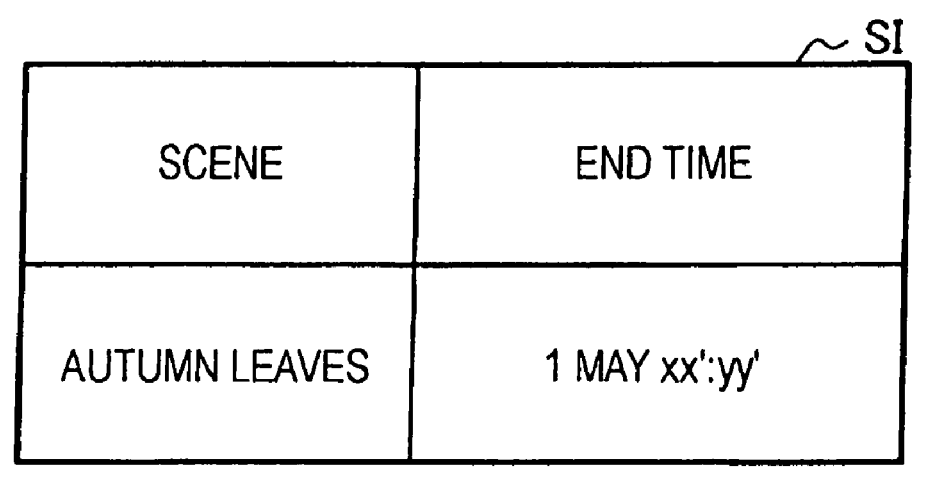

In a step S310 (FIG. 8), the communication control unit 248 (FIG. 5) of the photographing information providing device 200a controls the transmission unit 224 to transmit the scene information SI to the DSC 100a. FIG. 10 is a view showing an example of content of the scene information SI. As shown in FIG. 10, the scene information SI includes information indicating the scene ("autumn leaves" in the example of FIG. 10). The scene information SI is generated on the basis of the result of specifying the scene in the step S306. In the present embodiment, the scene information SI includes end time information indicating the end time of the event. The end time information included in the scene information SI is used when judging the end time (step S392 of FIG. 8) as described below. The DSC 100a receives the transmitted scene information SI through the reception unit 122 (FIG. 5). FIG. 9B shows a state in which the scene information SI is transmitted from the photographing information providing device 200a to the DSC 100a.

When the position/time information PTI is not received by the photographing information providing device 200a in the step S304 or the scene information SI is not received by the DSC 100a in the step S310, the photographing parameter value setting process is finished. If desired by the user, the photographing parameter value setting process resumes from the start.

In a step S332 (FIG. 8), the photographing parameter setting unit 144 (FIG. 5) of the DSC 100a specifies the photographing parameter values on the basis of the scene information SI (FIG. 10). More particularly, the photographing parameter setting unit 144 specifies a scene on the basis of the scene information SI and specifies the photographic parameter value corresponding to the scene on the basis of the correspondence information CI (FIG. 7).

In a step S350 (FIG. 8), the judgment unit 146 (FIG. 5) of the DSC 100a judges whether the photographing parameter values specified in the step S332 is identical to the parameter values which are currently set to be used for the photographing (that is, the parameter values indicated by the photographing parameter value information PV (FIG. 5)). If so not, the process progresses to a step S390 (setting of the photographing parameter values). In contrast, if so, the process of the step S390 is skipped, because the setting of the update of the photographing parameter values is not required.

Figure 9C:
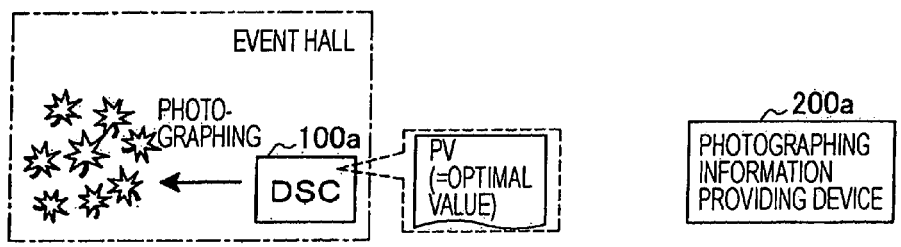

In the step S390 (FIG. 8), the photographing parameter setting unit 144 (FIG. 5) sets the update of the photographing parameter value information PV by replacing the photographing parameter values included in the photographing parameter value information PV with the photographing parameter values specified in the step S332. Accordingly, the photographing parameter values used when the DSC 100a performs the photographing is set as the photographing parameter values suitable for the photographing of the event. In this state, it is possible to generate a desired image by performing the photographing using the DSC 100a. FIG. 9C shows a state in which the updated DSC 100a performs the photographing such that the photographing parameter value information PV indicates the optimal parameter value.

In the step S392 (FIG. 8), the judgment unit 146 (FIG. 5) of the DSC 100a judges the end time. The judgment of the end time is a process of judging whether the end time of the event passes or not. In the present embodiment, as described above, the scene information SI (FIG. 10) transmitted by the photographing information providing device 200a includes the end time information indicating the end time of the event. Accordingly, the DSC 100a can acquire the end time of the event by receiving the scene information SI. The judgment of the end time using the judgment unit 146 of the DSC 100a is executed by comparing the end time of the event with the current time output from the timer 118 (FIG. 5). The judgment of the end time is repeatedly executed whenever a predetermined time period elapses until it is judged that the end time of the event passes. The judgment of the end time may be executed upon the turn-on operation or the turn-off operation of the power supply source. When it is judged that the end time of the event passes in the judgment of the end time, the process progresses to a step S400.

Figure 9D:
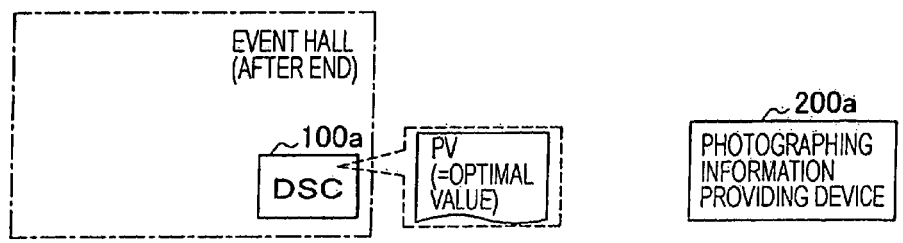

In the step S400 (FIG. 8), the photographing parameter setting unit 144 (FIG. 5) of the DSC 100a sets the update of the photographing parameter value information PV such that the parameter value indicated by the photographing parameter value information PV becomes a standard value. Accordingly, the photographing parameter value information PV which is set as contents suitable for the photographing during the event is set to an initial state again. FIG. 9D shows a state in which the photographing parameter value information PV of the DSC 100a is updated to a standard state.

As described above, in the photographing parameter value setting process of the photographing parameter setting system 10a (FIG. 5) according to the second embodiment, the scene information SI for specifying the scene corresponding to the event photographed by the DSC 100a is transmitted from the photographing information providing device 200a to the DSC 100a. In the DSC 100a which receives the scene information SI, the update of the photographing parameter value information PV is set such that the photographing parameter values used for the photographing become the values suitable for the photographing in the scene specified by the scene information SI. Accordingly, in the photographing parameter setting system 10a according to the second embodiment, the DSC 100a can easily and adequately set the photographing parameter values used for the photographing.

In the photographing parameter value setting process of the photographing parameter setting system 10a according to the second embodiment, position/time information PTI for specifying a current position of the DSC 100a and a current time is transmitted from the DSC 100a to the photographing information providing device 200a as information specifying the event. In the photographing information providing device 200a, an event photographed by the DSC 100a is specified on the basis of the position/time information PTI and a scene corresponding to the event is specified. Accordingly, in the photographing parameter setting system 10a according to the second embodiment, the photographing information providing device 200a does not need to be mounted in the event hall in which the photographing is performed using the DSC 100a. That is, the photographing information providing device 200a can be placed independent of the geographic range of the event. A single photographing information providing device 200a can be commonly used for photographing parameter value setting processes of a plurality of events.

In the photographing parameter value setting process of the photographing parameter setting system 10a according to the second embodiment, the scene information for specifying the scene is transmitted from the photographing information providing device 200a to the DSC 100a. Accordingly, it is possible to reduce the amount of information communicated between the photographing information providing device 200a and the DSC 100a and to reduce a communication load or increase the speed of the process, compared with a case of transmitting the photographing parameter values of the optimal parameter value information OV according to the first embodiment.

In the photographing parameter value setting process of the photographing parameter setting system 10a according to the second embodiment, the scene information SI transmitted from the photographing information providing device 200a to the DSC 10a includes the end time information indicating the end time of the event. Thus, when the event is finished, the DSC 100a can return the photographing parameter value information PV to the initial time. Accordingly, in the photographing parameter setting system 10a according to the second embodiment, the DSC 100a can easily and surely perform initialization of the photographing parameter values (change to the standard value) after the photographing of the event is finished.

In the photographing parameter value setting process of the photographing parameter setting system 10a according to the second embodiment, the scene information SI for specifying the scene is transmitted from the photographing information providing device 200a to the DSC 100a. The DSC 100 which receives the scene information SI can add information for identifying the scene specified by the scene information SI to an image file generated by the photographing. Accordingly, information for identifying the scene added to the image file can be used for searching the image after the photographing.

C. Modified Examples

The invention is not limited to the above-described embodiments or examples and may be implemented in a variety of aspects without departing from the scope of the invention. The invention may be modified as follows.

C1. Modified Example 1

In the respective above-described embodiments, the photographing parameter items included in the photographing parameter value information PV and the optimal parameter value information OV are only exemplary. The other parameter items may be included in the photographing parameter value information PV and the optimal parameter value information OV or some of the parameter items may not be included. The photographing parameter value information PV and the optimal parameter value information OV may include at least one of special processes such as shutter speed, diaphragm setting, exposure, ISO sensitivity, photometry, white balance (WB), memory color correction, flash ON/OFF, sharpness, color saturation, contrast, focal length, backlight correction, tone curve, noise removal, color balance, red-eye reduction and sepia. The respective photographing parameter items included in the photographing parameter value information PV and the optimal parameter value information OV do not need to be identical to each other. When the photographing parameter items are not identical, the update of the photographing parameter values may be set only with respect to the photographing parameter items which are commonly included.

The type of the scene which is set in the respective embodiments is exemplary and the other scene may be set. For example, as the type of the scene, a night scene, macro, sports, flower, plant life, party, interior, commemorative photograph, baby, food, waterfall, flow of water, spray of water, tender green, popper, concert, twilight, snow scene, coast, underwater, through the glass and backlight may be set. As the scene, for example, the sports may be divided by items (soccer, gymnastic exercises or the like) and the flower or plant life may be divided by the type (sunflower, cherry blossom or the like).

C2. Modified Example 2

In the respective above-described embodiments, the contents of the photographing parameter value setting process are exemplary and a portion of the contents of the photographing parameter value setting process may be modified. For example, in the photographing parameter value setting process according to the first embodiment, the photographing information transmitted from the photographing information providing device 200 is the optimal parameter value information OV (see FIG. 4A). However, the photographing information transmitted from the photographing information providing device 200 may be the scene information SI (see FIG. 9B). In this case, similar to the second embodiment, the DSC 100 converts the scene into the photographing parameter value. In contrast, in the photographing parameter value setting process according to the second embodiment, the photographing information transmitted from the photographing information providing device 200a may be the optimal parameter value information OV.

In the photographing parameter value setting process according to the first embodiment, the update of the photographing parameter value information PV to the initial state is set by the cancellation signal CS (see FIGS. 4d and 4e. However, similar to the second embodiment, the update of the photographing parameter value information PV to the initial state may be set by the judgment of the end time (step S392 of FIG. 8). In contrast, in the photographing parameter value setting process according to the second embodiment, the update of the photographing parameter value information PV to the initial state may be set using the cancellation signal CS. In addition, after the photographing information is received, if a predetermined time period elapses without receiving the photographing information again, the update of the photographing parameter value information PV to the initial state may be set.

In the photographing parameter value setting process according to the first embodiment, it is judged whether the DSC 100 is in the automatic setting mode (step S160 of FIG. 3). However, this judgment does not need to be performed. In the photographing parameter value setting process according to the second embodiment, the judgment of the automatic setting mode may be performed, similar to the first embodiment.

In the photographing parameter value setting processes of the respective embodiments, the update of the photographing parameter value information PV to the standard value is set after the photographing of the event is finished. However, the update of the photographing parameter value information PV may be set to return to the state which is set before setting the photographing parameter value information PV on the basis of the photographing information.

C3. Modified Example 3

In the second embodiment, the transmission of the position/time information PTI for specifying the event from the DSC 100a to the photographing information providing device 200a is performed upon the photographing using the DSC 100a (that is, within the event hall just before the photographing). However, the transmission of the position/time information PTI may be previously performed at the other position. In this case, the time and the position of the event are specified by the position/time information PTI. That is, the time for performing the transmission of the photographing information using the photographing information providing device 200a may be set independent of the temporal range of the event. The information for specifying the event is not limited to the position/time information PTI and may be the other information such as an identification code if the photographing information providing device 200a can specify the event. For example, the DSC 100a may photograph a two-dimensional barcode to acquire the identification code of the event and transmit the identification code to the photographing information providing device 200a.

C4. Modified Example 4

In the respective above-described embodiments, information communication between the DSC 100 and the photographing information providing device 200 may be performed using any communication method such as wired communication, wireless communication or communication using a network.

C5. Modified Example 5

The configurations of the photographing parameter setting system 10 in the respective above-described embodiment are exemplary and the configuration of the photographing parameter setting system 10 may be modified. In the photographing parameter setting system 10 according to the first embodiment, the photographing information providing device 200 is placed in the event hall (see FIG. 4A). However, the photographing information providing device 200 may be placed such that the photographing information can be transmitted within the provision information transmission range. For example, only the transmission unit 224 (FIG. 1) of the photographing information providing device 200 may be placed in the event hall and the other units may be placed outside the event hall. In the photographing parameter setting system 10a according to the second embodiment, the photographing information providing device 200a is placed outside the event hall (see FIG. 9A). However, the photographing information providing device 200a may be placed in the event hall. In the respective above-described embodiment, a portion of the configuration realized by hardware may be replaced with software. In contrast, a portion of the configuration realized by software may be replaced with hardware.

What is claimed is:
1. A photographing parameter setting system comprising:
a photographing device which photographs an image; and
a photographing information providing device which provides photographing information for specifying predetermined photographing parameter values to the photographing device, wherein the photographing information providing device includes:

a photographing information storage unit which stores photographing information corresponding to a photographing opportunity defined by a temporal range and a geographic range; and a photographing information transmission unit which transmits the photographing information stored in the photographing information storage unit, and wherein the photographing device includes:

a photographing information reception unit which receives the photographing information transmitted from the photographing information transmission unit; and a photographing parameter setting unit which sets the predetermined photographing parameter values used for photographing at the photographing opportunity, on the basis of the received photographing information; and wherein the photographing information transmitted from the photographing information transmission unit is photographing condition specifying information indicating whether a photographing condition at the photographing opportunity corresponds to any one of a plurality of predetermined photographing conditions, and wherein the photographing parameter setting unit includes correspondence information for defining the plurality of photographing conditions and the predetermined photographing parameter values.

2. The photographing parameter setting system according to claim 1, wherein the photographing device further includes a photographing condition specifying information adding unit which adds the photographing condition specifying information to an image file indicating the image generated by the photographing.

3. A photographing parameter setting system comprising:

a photographing device which photographs an image; and a photographing information providing device which provides photographing information for specifying predetermined photographing parameter values to the photographing device, wherein the photographing information providing device includes:

a photographing information storage unit which stores photographing information corresponding to a photographing opportunity defined by a temporal range and a geographic range; and a photographing information transmission unit which transmits the photographing information stored in the photographing information storage unit, and wherein the photographing device includes:

a photographing information reception unit which receives the photographing information transmitted from the photographing information transmission unit; and a photographing parameter setting unit which sets the predetermined photographing parameter values used for photographing at the photographing opportunity, on the basis of the received photographing information; and wherein the photographing device further includes a judgment unit which judges whether the photographing at the photographing opportunity is finished, and wherein the photographing parameter setting unit cancels the setting of the predetermined photographing parameter values on the basis of the photographing information when it is judged that the photographing at the photographing opportunity is finished by the judgment unit.

* * * * *